United States Patent
Von Matern

(10) Patent No.: US 9,239,232 B2
(45) Date of Patent: Jan. 19, 2016

(54) METHOD AND SYSTEM FOR DETERMINING POSITION AND ORIENTATION OF A MEASURING INSTRUMENT

(75) Inventor: Johan Von Matern, Danderyd (SE)

(73) Assignee: Trimble AB, Danderyd (SE)

( * ) Notice: Subject to any disclaimer, the term of this patent is extended or adjusted under 35 U.S.C. 154(b) by 264 days.

(21) Appl. No.: 13/978,187

(22) PCT Filed: Jan. 10, 2011

(86) PCT No.: PCT/EP2011/050195
§ 371 (c)(1),
(2), (4) Date: Jul. 3, 2013

(87) PCT Pub. No.: WO2012/095160
PCT Pub. Date: Jul. 19, 2012

(65) Prior Publication Data
US 2013/0278758 A1    Oct. 24, 2013

(51) Int. Cl.
| | |
|---|---|
| H04N 5/225 | (2006.01) |
| H04N 17/00 | (2006.01) |
| G01B 11/14 | (2006.01) |
| G01S 5/16 | (2006.01) |
| G01C 15/00 | (2006.01) |
| H04N 17/02 | (2006.01) |

(52) U.S. Cl.
CPC .............. *G01B 11/14* (2013.01); *G01C 15/002* (2013.01); *G01S 5/163* (2013.01)

(58) Field of Classification Search
USPC .......................... 348/159, 169, 180, 184, 189
See application file for complete search history.

(56) References Cited

U.S. PATENT DOCUMENTS

| | | | | |
|---|---|---|---|---|
| 5,644,318 | A * | 7/1997 | Janky et al. .............. | 342/357.31 |
| 6,035,254 | A * | 3/2000 | Nichols ........................ | 701/469 |
| 6,667,798 | B1 * | 12/2003 | Markendorf et al. ..... | 356/139.03 |
| 7,092,109 | B2 * | 8/2006 | Satoh et al. ................... | 356/620 |
| 7,168,174 | B2 * | 1/2007 | Piekutowski ................... | 33/286 |
| 7,312,862 | B2 * | 12/2007 | Zumbrunn et al. ....... | 356/139.03 |
| 8,351,686 | B2 * | 1/2013 | Graesser ...................... | 382/154 |
| 8,720,074 | B2 * | 5/2014 | Amor .............................. | 33/290 |
| 2006/0222314 | A1 | 10/2006 | Zumbrunn et al. | |
| 2009/0220144 | A1 | 9/2009 | Mein et al. | |
| 2011/0007154 | A1 * | 1/2011 | Vogel et al. ................... | 348/142 |

FOREIGN PATENT DOCUMENTS

| | | |
|---|---|---|
| EP | 1200853 A1 | 5/2002 |
| WO | WO-0109642 A1 | 2/2001 |
| WO | WO-2004057269 A1 | 7/2004 |
| WO | WO-2009100728 A1 | 8/2009 |
| WO | WO-2010080950 A1 | 7/2010 |

OTHER PUBLICATIONS

International Search Report PCT/ISA/210 for International Application No. PCT/EP2011/050195 Dated Sep. 19, 2011.

\* cited by examiner

*Primary Examiner* — Daquan Zhao
(74) *Attorney, Agent, or Firm* — Harness, Dickey & Pierce

(57) ABSTRACT

A method for determining position and orientation of a first measuring instrument is disclosed. A second MI and at least one reflective target including a retroreflector unit are arranged in the vicinity of the first MI. At least one imaging module is arranged in the first MI for determining orientation thereof. The at least one imaging module in the first MI can be used in a similar manner as a tracker unit of an optical total station, by way of detecting optical radiation emitted from the second MI and reflected by the at least one TGT.

44 Claims, 10 Drawing Sheets

METHOD AND SYSTEM FOR DETERMINING POSITION AND ORIENTATION OF A MEASURING INSTRUMENT

TECHNICAL FIELD

The present invention relates to the field of measuring, in particular surveying. In particular, the present invention is related to a method and a system for determining position and orientation of a first measuring instrument, such as a portable scanner allowing for hand-held operation by a user.

BACKGROUND

The art of surveying involves determination of unknown positions, surfaces or volumes of objects using measurements of angles and distances. In order to make these measurements, a surveying instrument frequently comprises an electronic distance measuring device (EDM) that may be integrated in a so-called total station. A distance measuring total station combines electronic, optical and computer techniques and is furthermore provided with a computer or control unit with writable information for controlling the measurements to be performed and for storing data obtained during the measurements. Preferably, the total station calculates the position of a target in a fixed ground-based coordinate system. In, for example, WO 2004/057269 by the same applicant, such a total station is described in more detail.

A tracker system or unit of an optical total station normally focuses a light signal from a target located at an object, either a reflection of an incident measuring beam comprising optical radiation from the target or from an active device on the target, onto a detector. A servo system of the total station may move or turn the total station based on the signal from the detector.

Further, when performing distance measuring or surveying tasks using a distance measuring total station at a work site, it is often desirable to measure a surface or volume of an object being present on the work site. In such a work site, it may, for example, be desirable to scan a surface of an object, for example, a wall of a building to obtain an image of the wall. For such applications, a distance measuring total station may be implemented as a geodetic scanner for determining the appearance of the object or target based on the measurements of distances to positions of interest at the surface of the target. Such a scanner may register the surface or volume of the target or even monitor changes in a scene.

The geodetic scanner is often set up at a certain position at the work site, from which position the surface or volume of the target that is to be scanned is visible. For scanning surfaces or volumes of the target or of another target that are not visible from the position at which the geodetic scanner is set up, the geodetic scanner has to be moved to another position at which visibility of the surfaces or volumes desired to be scanned is attained. This process may be cumbersome and time-consuming, e.g., due to the labor involved in moving the geodetic scanner and in setting up the geodetic scanner once it has been positioned at a new position.

For overcoming these disadvantages, mobile scanners are available that can be operated hand-held. In other words, a user can carry the mobile scanner to a suitable position at which the surfaces or volumes desired to be scanned are visible, and at that position operate the scanner so as to perform scanning of the surfaces or volumes. In order to know where the light beam of the mobile scanner is aiming during a measurement session, e.g., in relation to some fixed coordinate system such as a coordinate system related to another measuring instrument at the work site, position and orientation of the mobile scanner must be monitored during the measurement session, e.g., in relation to the fixed coordinate system.

EP 1200853 A1 discloses a method for determining the orientation of an object onto which a reflector is arranged, which reflector has a non-adjustable or adjustable orientation with respect to the object. A laser tracker is sending out a laser beam impinging on the reflector. The direction and path length of the laser beam and the angle of incidence of the laser beam into the reflector and/or the reflector orientation relative to the object are measured. Using the measured data, the orientation and position of the object are determined. For measuring the angle of incidence, a position sensitive diode position sensor, arranged in a plane perpendicular to the optical axis of the reflector, is arranged behind the reflector such that the beam part penetrating through the reflector impinges thereon. According to EP 1200853 A1, the position of the light spot detected by the sensor is directly dependent on the angle of incidence of the laser beam into the reflector.

U.S. Pat. No. 7,312,862 B2 discloses a measurement system for determining six degrees of freedom of a reflector or of an object on which the reflector is arranged. The measurement system comprises a laser tracker equipped with a distance measuring apparatus, the laser tracker directing a laser beam (measurement beam) to the reflector and following or tracking the reflector, when moving, and detecting the direction of the measurement beam relatively to the tracker. The measurement system also comprises an optically detectable addition element arranged on the object for determining rotation of the reflector or of the object about the reflector axis or about the measurement beam. The addition element consists of two light points, which are passive markings, reflectors, active light sources or points produced by light beams directed against the object. The two light points are imaged in an imaging plane with a camera that is stationary with respect to the measurement beam during measurement. Each of the light points is identified in an image taken by the camera, or the light points are synchronized with the camera, such that the light points appear one after the other on consecutively recorded images, and a line connecting the two light points is determined from the images. According to U.S. Pat. No. 7,312,862 B2, an angle between the line and a likewise directed reference line is a measure of the roll angle of the reflector or the object.

Such arrangements for determining orientation of an object may provide only limited angular accuracy and/or angular resolution that can be insufficient in some applications. In other words, such arrangements for determining orientation of an object may not be able to determine orientation of the object with the required degree of accuracy.

Such arrangements for determining orientation of an object may provide only a limited range of operation with regards to the distance between the object and the measuring apparatus effectuating the determination of orientation of the object with regards to some applications. That is, the maximum distance between the object and the measuring apparatus effectuating the determination of orientation of the object may be relative small.

SUMMARY

It is with respect to the above considerations and others that the present invention has been made. The present invention seeks to mitigate, alleviate or eliminate one or more of the above-mentioned deficiencies and disadvantages singly or in combination. In particular, it would be desirable to achieve a method for determining position and orientation of a first measuring instrument, which method is capable of determining orientation of the object with a high degree of accuracy with regards to angle of rotation about one or more rotational axes. It would also be desirable to achieve a method for determining position and orientation of a first measuring instrument, which method provides a long range of operation with regards to the distance between the first measuring instrument and the measuring apparatus responsible for making the determination.

To achieve this, a method and a system having the features as defined in the independent claims are provided. Further advantageous embodiments of the present invention are defined in the dependent claims.

In order to clarify, the wording "total station" used herein refers to a distance measuring instrument with an integrated distance and angular measurement, i.e. with combined electronic, optical and computer techniques. Such an instrument can provide both the distance as well as the vertical and horizontal direction towards a target, whereby the distance is measured against an object or target such as a reflector. The wording "total station" as used herein includes the following terms: survey unit, geodetic instrument.

According to a first aspect of the present invention, there is provided a method for determining position and orientation of a first measuring instrument (MI), wherein a second MI and at least one target (TGT) preferably are located in the vicinity of the first MI. The first MI comprises a retroreflector unit, at least one first optical radiation source configured to emit optical radiation when activated, and at least one imaging module. The second MI comprises at least one first optical radiation source configured to emit optical radiation when activated. The at least one TGT comprises identification means enabling an indtification of the TGT in an image.

The method comprises measuring angle and distance to the first MI and the at least one TGT, respectively, in relation to the second MI.

The at least one imaging module is caused to capture images, including alternating activation and deactivation of the at least one second optical radiation source.

An image representation of each captured image is produced.

Differential images using the image representations are created.

Information regarding objects being present in the differential images are extracted.

Using the extracted information, the second MI and the at least one TGT, respectively, are distinguished from any other objects present in the images.

On a condition that the second MI and the at least one TGT can be distinguished from any other objects present in the images, and on basis of the extracted information, any of the image representations is/are processed to determine angular information of the second MI and/or the at least one TGT with respect to at least one axis, respectively.

On a condition that the second MI and the at least one TGT can be distinguished from any other objects present in the images, and on basis of angle and distance to the second MI and/or the at least one TGT, respectively, in relation to the first MI, and the angular information, orientation of the first MI is estimated.

According to a second aspect of the present invention, there is provided a system comprising a first MI, a second MI and at least one TGT, each of the second MI and the at least one TGT preferably being located in the vicinity of the first MI. The first MI comprises a retroreflector unit. The TGT comprises an identifying means enabling the TGT to be identified in an image capturing the TGT.

The second MI comprises at least one second optical radiation source, configured to emit optical radiation when activated, and a position calculating circuit, comprising an angle measuring system and a distance measuring system, adapted to measure angle and distance to the first MI and the at least one TGT, respectively.

The first MI comprises at least one first optical radiation source configured to emit optical radiation when activated, a control module and a communication module adapted to, on instruction from the control module, communicate control signals to the second MI for activating or deactivating the at least one second optical radiation source.

The communication module is adapted to receive signals from the second MI indicating distances and angles determined by the second MI.

The first MI comprises at least one imaging module adapted to, on instruction from the control module, capture an image, wherein the control module is adapted to cause the at least one imaging module to capture images including alternating activation and deactivation of the at least one first optical radiation source and the at least one second optical radiation source, and produce an image representation of each captured image.

The first MI comprises a processing module adapted to create differential images using the image representations, extract information regarding objects being present in the differential images, and distinguish the second MI and the at least one TGT, respectively, from any other objects present in the images using the extracted information.

The processing module is adapted to, on a condition that the second MI and the at least one TGT can be distinguished from any other objects present in the images, on basis of the extracted information, process any of the image representations to determine angular information of the second MI and/or the at least one TGT with respect to at least one axis, respectively.

The processing module is adapted to, on a condition that the second MI and the at least one TGT can be distinguished from any other objects present in the images, on basis of angle and distance to the second MI and the at least one TGT, respectively, and the angular information, estimate orientation of the first MI.

Thus, the present invention is based on utilizing one or several camera devices, or imaging modules, arranged in the first MI for determining orientation thereof. The at least one imaging module in the first MI can be used to detect the identifying means of the TGT and can be used in a similar manner as a tracker unit of an optical total station, by means of detecting optical radiation emitted from the second MI.

Optionally or alternatively, orientation of the first MI may be estimated on basis of measured or estimated physical coordinates of the first MI and the at least one TGT established by the second MI and communicated to the processing module, e.g., by means of wireless communication link.

The orientation and/or position of the first MI can be determined with respect to a coordinate system suitable for the particular situation or application. For example, the orientation and/or position of the first MI can be determined with respect to a coordinate system fixed on the second MI.

The first MI may for example comprise a portable scanner configured such as to enable hand-held operation by a user (in the following such a portable scanner may be referred to as "hand-held unit" or "hand-held scanner"). The portable scanner can for example be utilized for determining the appearance of an object or target.

The position of the first MI is determined or monitored by the second MI, which second MI for example may comprise a surveying instrument such as a total station or theodolite, while orientation of the first MI is determined or monitored by the first MI itself.

For enabling determination of orientation of a hand-held unit, according to one example a camera device in a MI such as a total station can be arranged to determine or monitor an array of diodes arranged on the hand-held unit. Compared to such a solution, by a method or system according to the first and second aspect of the invention, respectively, an increased angular accuracy/angular resolution may be achieved. This is due to possibility of a finer spacing of pixels in images captured by the imaging module compared to the spacing of 'pixels', i.e. diodes, in the array on the hand-held unit.

Compared to an arrangement where an array of diodes arranged on the first MI is monitored by a camera device arranged on the second MI in order to determine orientation of the first MI, an arrangement based on the at least one imaging module in the first MI being used for detecting optical radiation emitted from the second MI and the at least one TGT, which in turn allows for estimating orientation of the first MI, may achieve a relatively long range of operation with regards to the distance between the first MI and the second MI.

By a method or system according to the first and second aspect of the invention, respectively, an increased flexibility with regards to tuning or adjusting angular accuracy/angular resolution of the determined orientation of the first MI may be achieved. This can for example be accomplished by selecting an imaging device to be arranged in the first MI having a pre-selected resolution/pixel density by which a desired angular accuracy/angular resolution of the determined orientation of the first MI may be provided.

By a method or system according to the first and second aspect of the invention, respectively, an increased speed in scanning an object or target may be achieved. This is due to the configuration of the system that enables the first MI to be portable. In this case, the first MI can be operated from various positions at a work site without the need of having to go through a time-consuming process of setting up a geodetic scanner at each of the desired operating positions at the work site.

By the possibility of the first MI being portable, areas or surfaces desired to be scanned can be reached by optical radiation emitted from the first MI by the user positioning the first MI appropriately, even if those areas or surfaces are hidden from view from a fixed position at the work site.

As discussed above, the angular information of the second MI and/or the at least one TGT can be determined by any of the image representations being processed on basis of the extracted information regarding objects being present in the differential images. For example, the angular information of the second MI and/or the at least one TGT can be determined with respect to a coordinate system related to the at least one imaging module or device.

However, a coordinate transformation may be performed in order to transform any angular information, e.g., orientation (or angles), determined with respect to some coordinate system, to another coordinate system suitable for the particular situation or application. Such coordinate transformations are known in the art.

In the context of the present application, by angular accuracy of an arrangement for determining orientation of an object, it is meant the degree of accuracy with regards to angle of rotation about one or more rotational axes that can be achieved, i.e. the numerical accuracy with which the orientation or angle can be determined.

In the context of the present application, by angular resolution of an arrangement for determining orientation of an object, it is meant a relatively small angle or even the smallest angle that can be determined when the object undergoes a (small) change in orientation.

According to a third aspect of the present invention, there is provided a first MI for scanning a surface or volume of an object to determine appearance of the object, which first MI may be used a system according to the second aspect of the present invention or any embodiment thereof. The first MI is adapted to transmit optical radiation from the at least one first optical radiation source to and receive optical radiation reflected from a position on the object, in order to measure angle and distance to the position on the object, wherein the direction of the transmitted optical radiation and/or the received optical radiation is monitored by consecutively determining position and orientation of the first MI.

The first MI may comprise a scanning device configured to guide the transmitted optical radiation at predetermined positions over the object.

According to a fourth aspect of the present invention, there is provided a method for scanning a surface or a volume of an object to determine appearance of the object with a first MI, which first MI comprises at least one first optical radiation source configured to emit optical radiation when activated.

The method comprises transmitting optical radiation from the at least one first optical radiation source to and receiving optical radiation reflected from a position on the object in order to measure angle and distance to the position on the object.

The direction of the transmitted optical radiation and/or the received optical radiation is monitored by determining position and orientation of the first MI by consecutively performing a method according to the first aspect of the present invention or any embodiment thereof.

The transmitted optical radiation may be guided at predetermined positions over the object.

According to a fifth aspect of the present invention, there is provided a first MI configured such as to enable operation thereof in a system according to the second aspect of the present invention or any embodiment thereof.

According to a sixth aspect of the present invention, there is provided a computer program product comprising computer-executable components for performing a method according to the first and/or fourth aspect of the present invention or any embodiment thereof when the computer-executable components are executed on a processing unit.

According to a seventh aspect of the present invention, there is provided a computer-readable digital storage medium comprising a computer program product comprising computer-executable components adapted to, when executed on a processing unit, perform a method according to the first and/or fourth aspect of the present invention or any embodiment thereof.

The present invention can be implemented in a computer program product that, when executed in a processing unit, performs a method in accordance with the present invention in an MI. The computer program product may, for example, be downloaded into the MI as an upgrade. A method in accordance with the present invention can be implemented for an MI using software, hardware, firmware or any combination thereof, as desired or required in view of the particular circumstances or application.

In an embodiment of the present invention, the control module of the first MI is adapted to cause the at least one imaging module to capture images including alternating activation and deactivation of the at least one first optical radiation source and the at least one second optical radiation source.

According to embodiments of the present invention, the identifying means is a retroreflector unit and the TGT is a reflective target.

According to embodiments of the present invention, the identifying means comprises at least one optical radiation source configured to continuously emit optical radiation or to emit optical radiation when activated. The identification means may be at least one lamp, light emitting diode, or similar light emitting device. If there is more than one light emitting device, the devices can be arranged in a pattern. The light emitting device may emit fixed light, or blinking or flashing light, which may be random, or in accordance with a predetermined pattern. The light emitting device may be controlled by the first and second MI via, for example, a wireless communication link. Thereby, the at least one light emitting device can be controlled to blink or flash at receipt of an activation signal. Further, the at least one light emitting device may emit light with a certain colour, and if there are more than one light emitting device the device may emit light with different colours.

According to embodiments of the present invention, the identifying means comprises a geometrical symbol or pattern, for example, one or more circular surfaces, one or more square-shaped surfaces, one or more rhombical-shaped surfaces, or an arbitrary combination of such surfaces. The surface (–s) may be reflective and/or may include light emitting devices.

With regards to creating differential images, the at least one imaging module may be adapted to capture images under different operating conditions of at least the first MI and/or the second MI. Images may be captured at different points in time. Differential images may be produced based on the captured images, such as described in the following.

According to a first configuration, at least one first image is captured when the at least one second optical radiation source is activated and the at least one first optical radiation source is deactivated. At least one second image may be captured when the at least one second optical radiation source is deactivated and the at least one first optical radiation source is activated. At least one third image is captured when both of the at least one second optical radiation source and the at least one first optical radiation source are deactivated.

According to a second configuration, at least one first image is captured when the at least one second optical radiation source is activated and the at least one first optical radiation source is deactivated. At least one second image may be captured when the at least one second optical radiation source is activated and the at least one first optical radiation source is activated. At least one third image may be captured when the at least one second optical radiation source and the at least one first optical radiation source are deactivated.

According to a further configuration, if the identifying means is a light emitting device controlled by the first MI via wireless communication, at least one first image can be captured when the at least one second optical radiation source is activated and the at least one optical radiation source of the TGT is deactivated. At least one second image may be captured when the at least one second optical radiation source is deactivated and the at least one optical radiation source of the TGT is activated. At least one third image can be captured when both of the at least one second optical radiation source and the at least one optical radiation source of TGT are deactivated.

With regards to creating differential images using the image representations, at least one first differential image between the at least one first image representation and the at least one third image representation may be created. At least one second differential image between the at least one second image representation and the at least one third image representation may be created.

Information regarding objects being present in the differential images may be extracted by extracting information regarding objects being present in the at least one first differential image and the at least one second differential image, respectively.

According to a another configuration, at least one first image is captured when the at least one second optical radiation source is activated and the at least one first optical radiation source is deactivated, and at least one second image is captured when the at least one second optical radiation source is deactivated and the at least one first optical radiation source is activated.

With respect to the this configuration, at least one first differential image between the at least one first and the at least one second image representation may be created. In the at least one first differential image, intensity from the at least one second optical radiation source and intensity from the at least one first optical radiation source, which intensity arises from optical radiation reflected at the at least one TGT, may have different sign. For example, in the at least one first differential image, intensity from the at least one second optical radiation source may be positive and intensity from the at least one first optical radiation source may be negative.

Further with respect to this configuration, information regarding objects being present in the differential images may be extracted by extracting information regarding objects being present in the at least one first differential image.

With regards to determining angular information of the second MI and the at least one TGT with respect to at least one axis, any of the image representations may be processed to estimate at least one angle between the second MI and the at least one TGT with respect to the at least one axis. In this regard, the angular information may comprise the estimated at least one angle.

The estimation of at least one angle between the second MI and the at least one TGT with respect to the at least one axis may comprise determining distance between the second MI and the at least one TGT, distance between the second MI and the at least one axis and/or distance between the at least one TGT and the at least one axis.

Any one of the distance determinations may comprise determining a number of pixels in any of the images between the second MI and the at least one TGT, between the second MI and the at least one axis and/or between the at least one TGT and the at least one axis, respectively. In this regard, a dimension of a pixel in the images may correspond to a predetermined distance.

Distance between the first MI and the at least one TGT may be determined in at least two ways, of which two examples are described in the following.

According to a first example, the position of the first MI and the position of the at least one TGT may be determined on basis of measured angle and distance relatively to the first MI and the at least one TGT, respectively.

The distance between the first MI and the at least one TGT may then be determined on basis of the position of the first MI and the position of the at least one TGT.

According to a second example, distance between the first MI and the at least one TGT may be derived from the above-mentioned extracted information.

A comparison between distances between the first MI and the at least one TGT as determined in different ways may then be carried out.

On basis of the comparison, accuracy of the distinguishing of the MI and the at least one TGT, respectively, from any other objects present in the images may be assessed.

In other words, discrepancies between the distances between the first MI and the at least one TGT as determined in different ways may be checked. A large discrepancy, e.g., exceeding a predetermined threshold value, may then for example be used to reject the current measuring session.

In this manner, a procedure reducing or even eliminating false readings, i.e. inaccurately and/or incorrectly recognized targets and/or MIs, may be achieved.

Measuring angle and distance to the first MI and the at least one TGT, respectively, in relation to the second MI may comprise transmitting optical radiation from the at least one second optical radiation source and receiving optical radiation reflected by the retroreflector unit of the first MI and the retroreflector unit of the at least one TGT, respectively.

In this regard, time-of-flight of optical radiation from the at least one second optical radiation source to the first MI and the at least one TGT, respectively, may be measured.

Alternatively or optionally, phase difference of modulated continuous-wave optical radiation from the at least one second optical radiation source subsequent to the modulated continuous-wave optical radiation having been reflected by the retroreflector unit of the first MI and the retroreflector unit of the at least one TGT, respectively, may be measured.

The second MI may comprise a tracker and a servo system.

The tracker and servo system may be configured to monitor the position of the first MI.

In this regard, sets of images including alternating activation and deactivation of the at least one first optical radiation source and the at least one second optical radiation source may be consecutively captured. Orientation of the first MI on basis of each of the captured sets of images may be estimated.

In this manner, orientation of the first MI may be monitored, e.g. while the first MI is moving.

The communication module may be adapted to, on instruction from the control module, communicate control signals to the second MI configured to temporally synchronize the monitoring of the position of the first MI and the estimation of orientation of the first MI.

In a case where the second MI comprises a tracker and servo system, the second MI may not require a separate second optical radiation source as described in the foregoing. Instead, an optical radiation source comprised in the tracker and servo system may be utilized in place of a second optical radiation source for providing similar or the same functionality as the second optical radiation source as described in the foregoing and in the following. Thus, the second optical radiation source may be a part of the tracker and servo system.

The steps of any method disclosed herein do not have to be performed in the exact order disclosed, unless explicitly stated.

The present invention relates to all possible combinations of features recited in the claims.

Further objects and advantages of the various embodiments of the present invention will be described below by means of exemplifying embodiments.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the invention are shown. This invention may however be embodied in many different forms and should not be construed as limited to the embodiments set forth herein; rather, these embodiments are provided by way of example so that this disclosure will convey the scope of the invention to those skilled in the art. Furthermore, like numbers refer to like or similar elements throughout.

A total station is a distance measuring instrument with an integrated distance and angular measurement, i.e. with combined electronic, optical and computer techniques. Such a total station can provide both the distance as well as the vertical and horizontal direction towards an object or a target, whereby the distance is measured against a reflecting surface or a reflector, e.g. a retroreflector of the corner cube type. A total station is further provided with a computer or control unit with writable information for measurements to be performed and for storing data obtained during the measurements. The total station may calculate the position of a target in a fixed ground-based coordinate system. In, for example, WO 2004/057269 by the same applicant, such a total station is described in more detail.

Figure 1A:
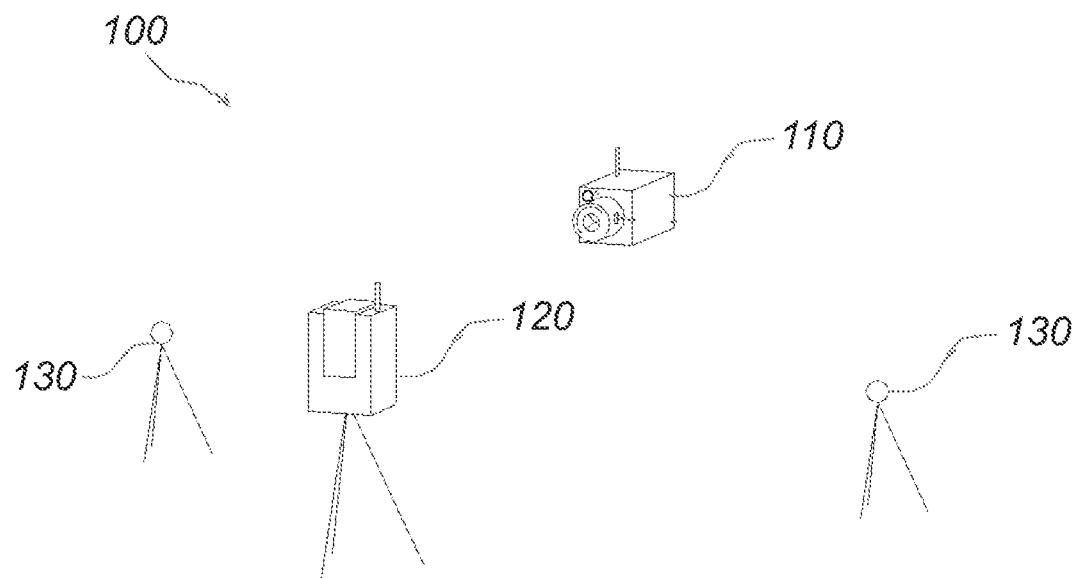
FIG. 1a is a schematic view of a system according to an exemplifying embodiment of the present invention.

Referring now to FIG. 1a, there is shown a schematic view of a system 100 according to an exemplifying embodiment of the present invention.

The system 100 comprises a first MI 110, a second MI 120 and two reflective TGTs 130.

The number of TGTs in the system 100 is not limited to two, but the system 100 may comprise any suitable number of TGTs depending on the particular situation and/or application, e.g., one TGT or three, four, five, six or more TGTs.

By utilizing several TGTs within the field of view of the imaging module (not shown in FIG. 1a, see FIG. 1 b) of the first MI 110, the area of operation can be increased. For example, the area over which the first MI 110 can be used, e.g., for scanning a surface or a volume of an object to determine appearance of the object, can be increased by utilization of several TGTs appropriately placed in the vicinity of the first MI and/or the second MI.

The components of the system 100 will be described in more detail with reference to FIG. 1b, in which there is shown a schematic block diagram of a system 100 according to an exemplifying embodiment of the present invention.

Figure 5A:
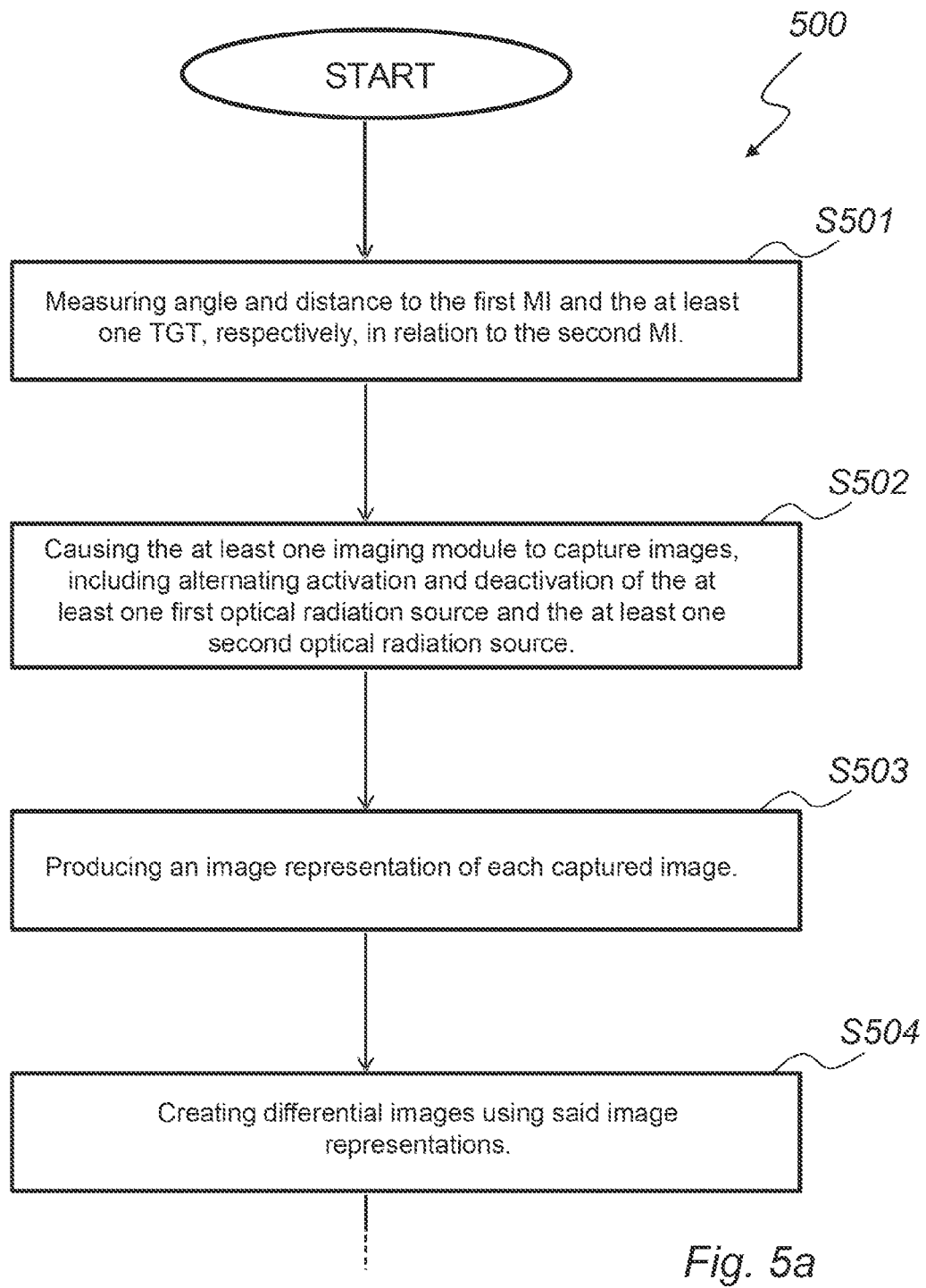
FIGS. 5a-5c are schematic flowcharts illustrating methods according to exemplifying embodiments of the present invention.
Figure 5B:
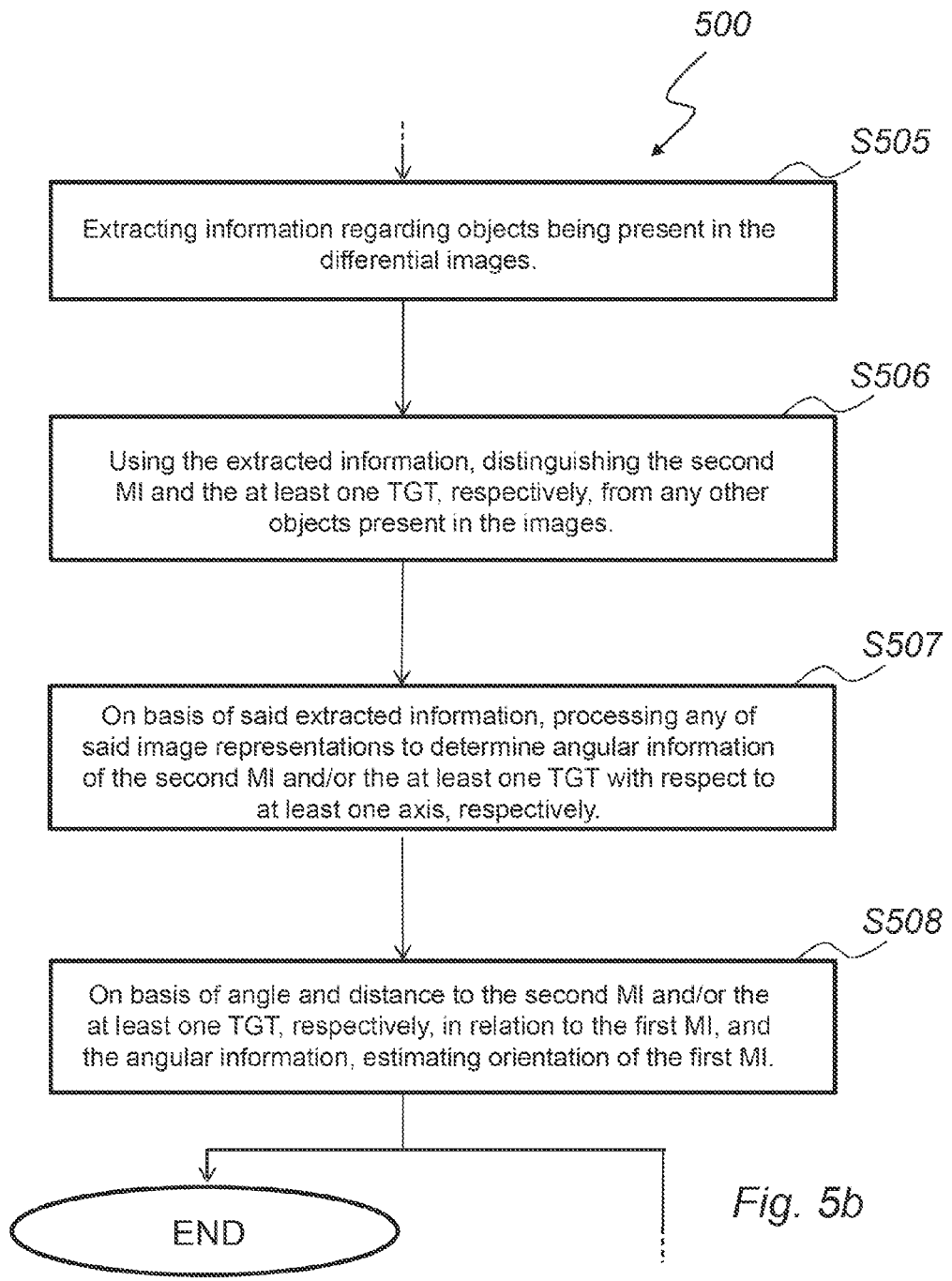
Figure 5C:
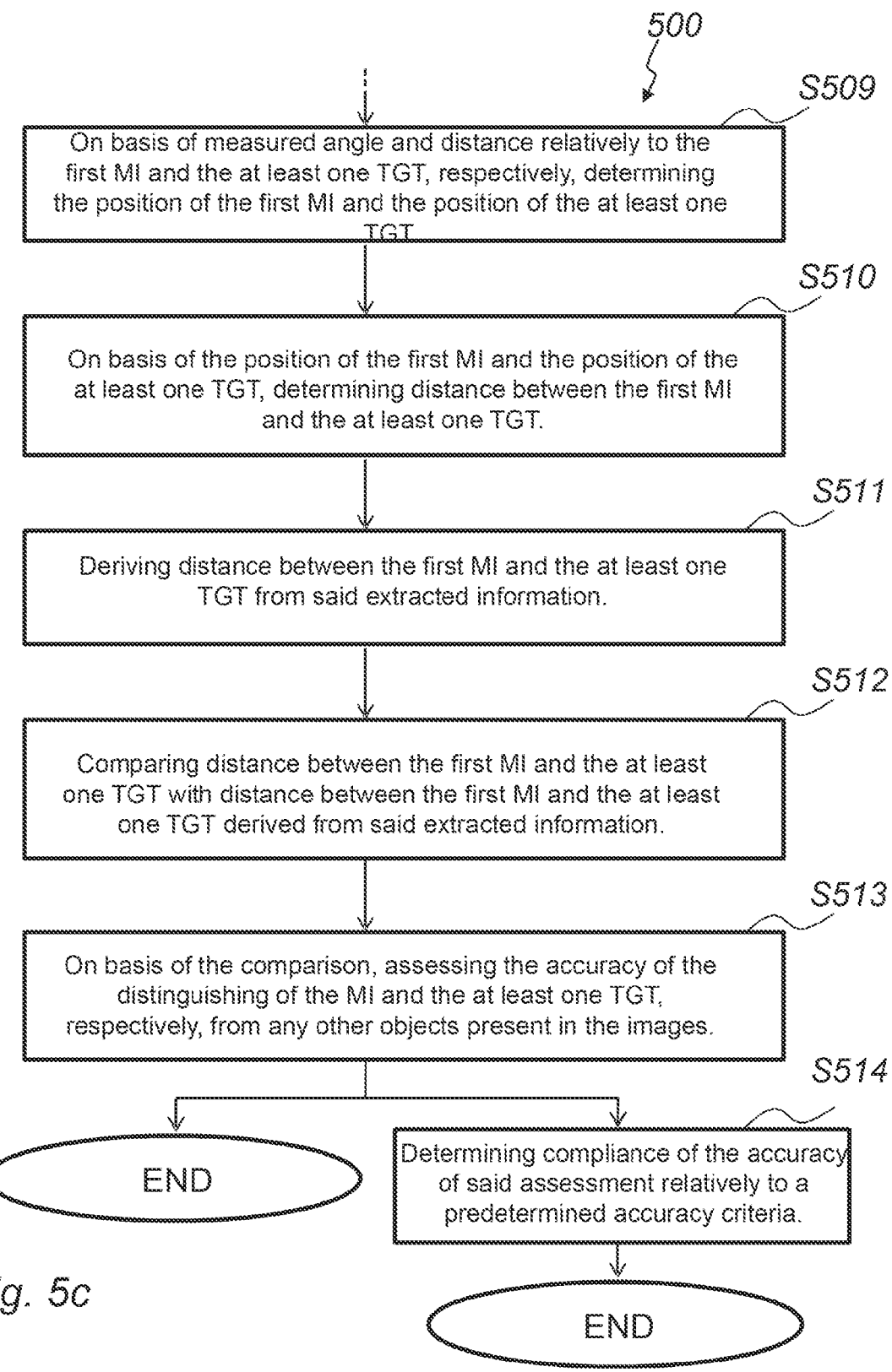

The system 100 comprises a first MI 110, a second MI 120 and a reflective TGT 130. As indicated in FIG. 1a, each of the second MI 120 and the TGT 130 is arranged in the vicinity of the first MI 110. Each of the first MI 110 and the TGT 130 comprises a retroreflector unit 135. The system 100 is configured to determine position and orientation of the first MI 110, as discussed in further detail in the following with reference to the schematic flowcharts in FIGS. 5a-5c illustrating exemplifying embodiments of the present invention.

Figure 1B:
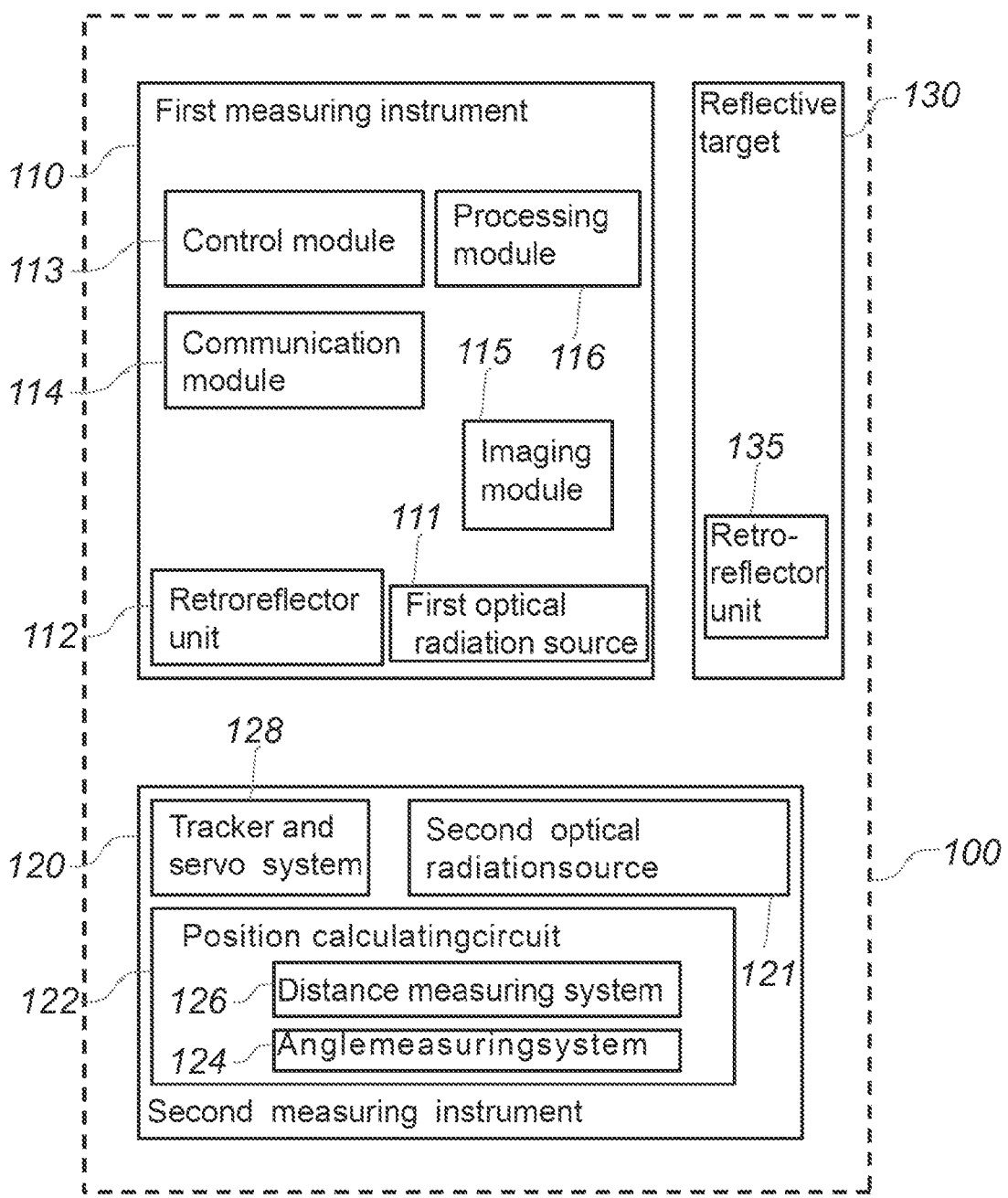
FIG. 1b is a schematic block diagram of a system according to an exemplifying embodiment of the present invention.

With further reference to FIG. 1b, the second MI 120 comprises a second optical radiation source 121 configured to emit optical radiation when activated.

The second MI 120 comprises a position calculating circuit 122, which comprises an angle measuring system 124 and a distance measuring system 126 adapted to measure angle and distance to the first MI 110 and the TGT 130, respectively.

The second MI 120 may for example comprise a total station such as described in the foregoing, which total station is capable of providing both the distance as well as the vertical and horizontal direction towards an object or a target.

Angle and distance to the first MI 110 and the TGT 130, respectively, may be measured by the second MI 120 prior to or at the start of the procedure of determining position and orientation of the first MI 110 and/or at a number of successive points in time during the procedure of determining position and orientation of the first MI 110.

In general, the TGT 130 is fixed at a site, while the first MI 110 may be moveable. In this regard, the first MI may for example comprise a portable scanner configured such as to enable hand-held operation by a user. The scanner may be configured to determine the appearance of an object.

Thus, according to one example, measurement of angle and/or distance to the TGT 130 may be performed less frequently during, e.g., the procedure of determining position and orientation of the first MI 110, compared to measurement of angle and/or distance to the first MI 110. The latter measurement may be performed at predefined points in time during the process of determining position and orientation of the first MI 110, thereby continually updating measured angle and/or distance values for the first MI 110.

The first MI 110 comprises at least one first optical radiation source 111 configured to emit optical radiation when activated, and a control module 113 adapted to selectively activate and deactivate the first optical radiation source 111.

The first MI 110 comprises a communication module 114. The communication module 114 is adapted to, on instruction from the control module 113, communicate control signals to the second MI 120 for activating or deactivating the second optical radiation source 121, e.g., via a wireless communication link. Optionally, signals other than control signals may be communicated to the second MI 120 by means of the communication module 114. The communication module 114 may optionally be adapted to receive control signals or any other signals from the second MI 120 and/or any other device capable of communicating signals. Communication to or from the communication module 114 may for example be performed via a wireless communication link.

The communication module 114 is adapted to receive signals from the second MI 120 indicating distances and angles determined by the second MI 120.

The first MI 110 comprises an imaging module 115. The imaging module 115 is adapted to, on instruction from the control module 113, capture an image. The control module 113 is adapted to cause the imaging module 115 to capture images, including alternating activation and deactivation of the first optical radiation source 111 and the second optical radiation source 121, and produce an image representation of each captured image.

The first MI 110 comprises a processing module 116.

The processing module 116 is adapted to create differential images using the image representations, extract information regarding objects being present in the differential images, and distinguish the second MI 120 and the TGT 130, respectively, from any other objects present in the images using the extracted information.

On a condition that the second MI 120 and the TGT 130 can be distinguished from any other objects present in the images, the processing module 116, on basis of the extracted information, processes any of the image representations to determine angular information of the second MI 120 and/or the TGT 130 with respect to at least one axis, respectively. On basis of angle and distance to the second MI 120 and the TGT 130, respectively, and the angular information, orientation of the first MI 110 is determined.

The second MI 120 may comprise a communication module (not shown in FIG. 1b) adapted to communicate signals, e.g., measured data, control signals, etc., to or receive signals from the first MI 110 and/or any other device capable of communicating signals. The communication may for example be performed via a wireless communication link.

Figure 2A:
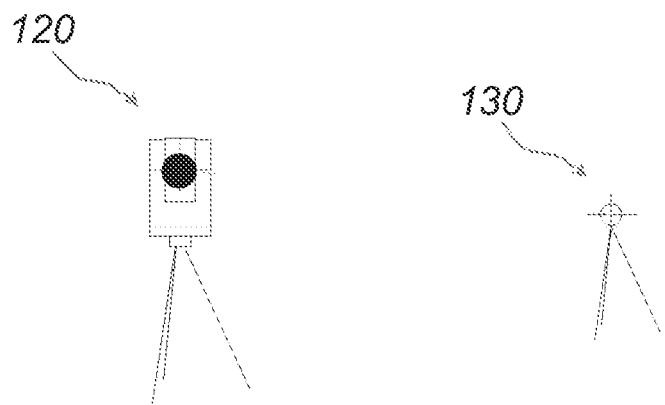
FIGS. 2a-2c are examples of captured images for use in a method according to an exemplifying embodiment of the present invention.
Figure 2B:
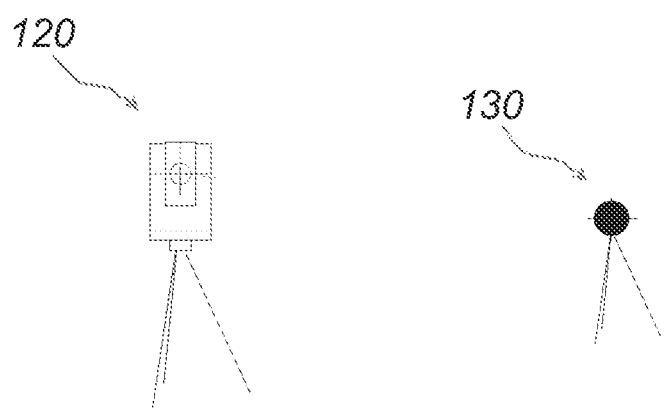
Figure 2C:
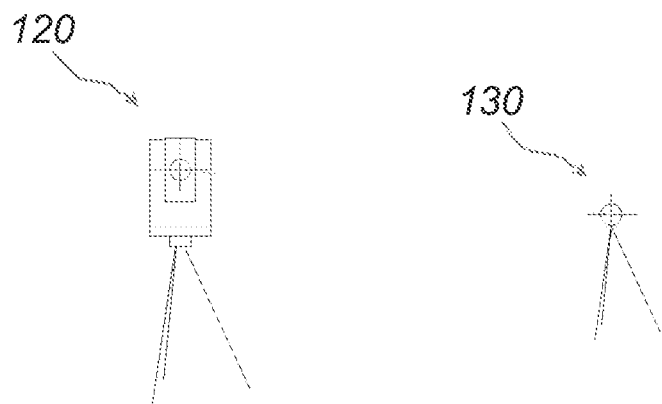

Referring now to FIGS. 2a-2c, there are shown schematic views of captured images, which in accordance with an exemplifying embodiment of the present invention may be used in creating differential images.

At least one first image is captured when the second optical radiation source 121 is activated, and the first optical radiation source 111 is deactivated. As indicated by the solid black circle in FIG. 2a, a spot arising from optical radiation emitted by the second optical radiation source 121 will be present in the first image.

At least one second image is captured when the second optical radiation source 121 is deactivated, and the first optical radiation source 111 is activated. As indicated by the solid black circle in FIG. 2b, a spot arising from optical radiation emitted by the first optical radiation source 111 and incident on the retroreflector unit 135 of the TGT 130 will be present in the second image.

At least one third image is captured when both of the second optical radiation source 121 and the first optical radiation source 111 are deactivated, shown in FIG. 2c.

After having produced image representations of each captured image, creating differential images may comprise creating at least one first differential image between the at least one first and the at least one third image representation, and creating at least one second differential image between the at least one second and the at least one third image representation.

Alternatively or optionally, differential images may be created according to schemes other than the one described immediately above, such as have been discussed in the foregoing.

Figure 3:
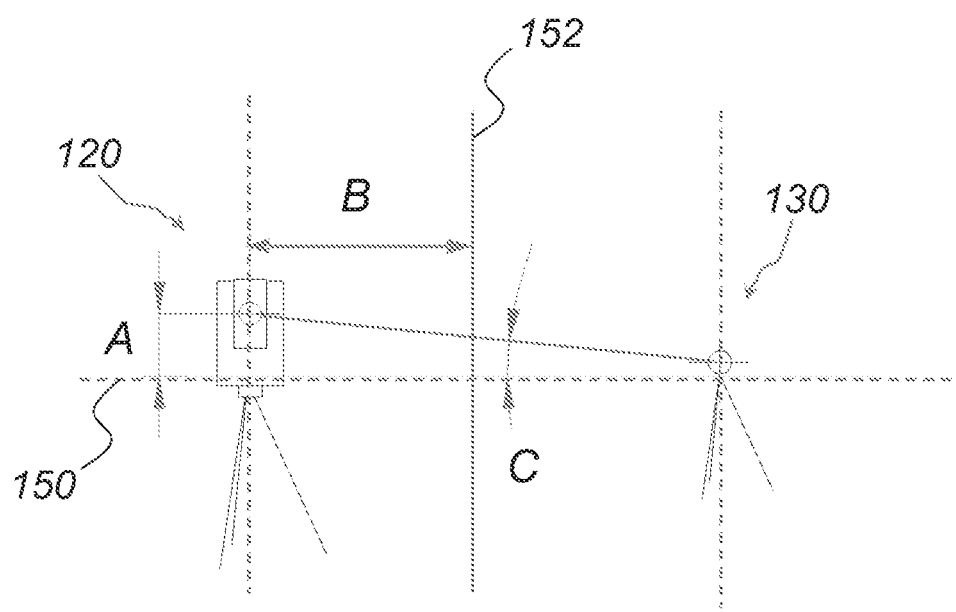
FIG. 3 is an example of a captured image for illustrating a principle of a method according to an exemplifying embodiment of the present invention.

Referring now to FIG. 3, there is shown a schematic view of a captured image in accordance with an exemplifying embodiment of the present invention, wherein a second MI 120 and a reflective TGT 130 are visible. An image representation of the captured image may be processed such as to to determine angular information of the second MI 120 and the TGT 130 with respect to at least one axis.

For example, distance B between the second MI 120 and an axis 152 and/or distance A between the second MI 120 and an axis 150 may be determined. The axis 150 may for example coincide with an internal horizontal axis of the imaging module of the first MI (not shown in FIG. 3). The axis 152 may for example coincide with an internal vertical axis of the imaging module of the first MI. Determination of distances may comprise determining a number of pixels in the captured image between the second MI 120 and the axis 152 and the number of pixels between the second MI 120 and the axis 150, respectively, wherein a dimension of a pixel in the image corresponds to a predetermined distance.

For example, on basis of the distances A and B and/or possibly other distances deduced from processing of the captured image the angle C shown in FIG. 3 may be determined.

It is noted that the orientations of the second MI 120 and the TGT 130 shown in FIG. 3 with respect to the imaging module of the first MI are in accordance with a specific example.

The second MI 120 and the TGT 130, respectively, may exhibit a range of orientations with respect to the imaging module on a condition that the second optical radiation source of the second MI 120 and the retroreflector unit of the TGT 130, respectively, are within the field of view of the imaging module, i.e. that the second optical radiation source of the second MI 120 and the retroreflector unit of the TGT 130, respectively, can be captured in an image by the imaging module.

Figure 4:
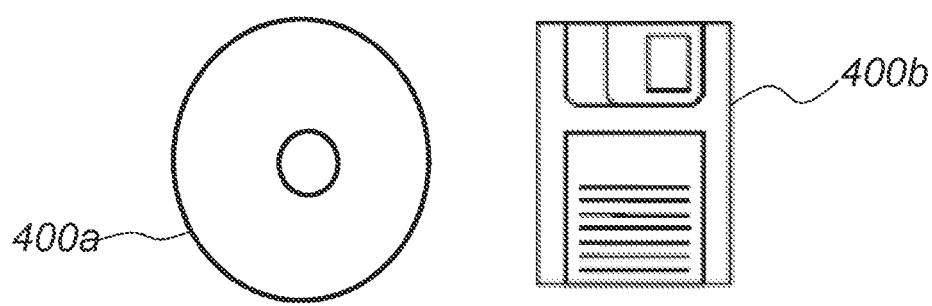
FIG. 4 is a schematic view of computer-readable storage mediums according to exemplifying embodiments of the present invention.

Referring now to FIG. 4, there are shown schematic views of computer readable digital storage mediums 400a, 400b according to exemplifying embodiments of the present invention, comprising a DVD 400a and a floppy disk 400b. On each of the DVD 400a and the floppy disk 400b there may be stored a computer program comprising computer code adapted to perform, when executed in a processor unit, a method according to embodiments of the present invention such as have been described herein.

Although only two different types of computer-readable digital storage mediums have been described above with reference to FIG. 4, the present invention encompasses embodiments employing any other suitable type of computer-readable digital storage medium, such as, but not limited to, a non-volatile memory, a hard disk drive, a CD, a Flash memory, magnetic tape, a USB memory device, a Zip drive, etc.

Furthermore, the first MI typically comprises one or more micro-processors (not shown in the drawings) or some other device with computing capabilities, e.g. an application specific integrated circuit (ASIC), a field programmable gate array (FPGA), a complex programmable logic device (CPLD), etc., in order to perform various operations as described herein. When performing steps of different embodiments of the method of the present invention, the microprocessor typically executes appropriate software that is downloaded to the first MI and stored in a suitable storage area, such as for example a Random Access Memory (RAM), a Flash memory or a hard disk drive. Such a microprocessor or processing unit may alternatively or optionally be located externally relatively to the first MI (and electrically connected to the first MI).

Referring now to FIGS. 5a-5b, there is shown a schematic flowchart of a method 500 according to an exemplifying embodiment of the present invention.

The method 500 can determine position and orientation of a first MI. The first MI comprises a retroreflector unit, at least one first optical radiation source configured to emit optical radiation when activated, and at least one imaging module. A second MI, which comprises at least one second optical radiation source configured to emit optical radiation when activated, and at least one reflective TGT, which comprises a retroreflector unit, are arranged in the vicinity of the first MI.

At step S501, angle and distance for the first MI and the at least one TGT, respectively, are measured in relation to the second MI.

At step S502, the at least one imaging module is caused to capture images, including alternating activation and deactivation of the at least one first optical radiation source and the at least one second optical radiation source.

At step S503, an image representation of each captured image is produced.

At step S504, differential images are created using the image representations.

At step S505, information regarding objects being present in the differential images is extracted.

Using the extracted information, the second MI and the at least one TGT, respectively, are distinguished from any other objects present in the images at step S506.

On a condition that the second MI and the at least one TGT can be distinguished from any other objects present in the images, steps S507 and S508 are performed.

At step S507, any of said image representations is processed on basis of said extracted information to determine angular information of the second MI and/or the at least one TGT with respect to at least one axis, respectively.

At step S508, orientation of the first MI is estimated on basis of angle and distance to the second MI and/or the at least one TGT, respectively, in relation to the first MI, and the angular information.

Optionally, steps S509-S513 may be performed.

At step S509, the position of the first MI and the position of the at least one TGT are determined on basis of measured angle and distance relatively to the first MI and the at least one TGT, respectively.

At step S510, distance between the first MI and the at least one TGT is determined on basis of the position of the first MI and the position of the at least one TGT.

At step S511, distance between the first MI and the at least one TGT is derived from the extracted information.

At step S512, distance between the first MI and the at least one TGT is compared with distance between the first MI and the at least one TGT, derived from the extracted information.

At step S513, on basis of the comparison, the accuracy of the distinguishing of the first MI and the at least one TGT, respectively, from any other objects present in the images is assessed.

In this manner, a procedure reducing or even eliminating false readings, i.e. inaccurately and/or incorrectly recognized targets and/or MIs, may be achieved.

Optionally, compliance of the accuracy of the assessment performed in step S513 relatively to a predetermined accuracy criteria may be determined at step S514. In other words, a quality check of the assessment may be performed. A method for scanning a surface or a volume of an object to determine appearance of the object with a first MI may comprise transmitting optical radiation from the first MI to and receive optical radiation reflected from a position on the object in order to measure angle and distance to the position on the object. The direction of the transmitted optical radiation and/or the received optical radiation is monitored by determining position and orientation of the first MI by consecutively performing a method such as been described herein.

The transmitted optical radiation may be guided at predetermined positions over the object.

Prior to the scanning procedure, angle and distance to the one or more TGTs from the second MI may be determined.

During the scanning procedure, angle and distance to the first MI from the second MI, angle between the first MI and the one or more TGTs relatively to an axis, and/or angle between the first MI and second MI relatively to an axis may be determined repeatedly.

Although exemplary embodiments of the present invention have been described herein, it should be apparent to those having ordinary skill in the art that a number of changes, modifications or alterations to the invention as described herein may be made. Thus, the above description of the various embodiments of the present invention and the accompanying drawings are to be regarded as non-limiting examples of the invention and the scope of protection is defined by the appended claims. Any reference signs in the claims should not be construed as limiting the scope.

The invention claimed is:

1. A method for determining a position and an orientation of a first measuring instrument, MI, the first MI including a retroreflector and at least one first optical radiation source configured to emit optical radiation when activated, said method comprising;
    selectively activating and deactivating the at least one first optical radiation source, and at least one imaging module, using a second MI, the second MI including at least one second optical radiation source configured to emit optical radiation when activated, and at least one target, TGT, the at least one TGT including at least one identifying device configured to enable the TGT to be identified in an image capturing said TGT;
    measuring an angle and a distance to the first MI and the at least one TGT, respectively, in relation to the second MI;
    causing the at least one imaging module to capture images, including alternating activation and deactivation of the at least one second optical radiation source;
    producing an image representation of each captured image;
    creating differential images using said image representations;
    extracting information regarding objects being present in the differential images;
    using said extracted information, distinguishing the second MI and the at least one TGT, respectively, from any other objects present in the images;
    on a condition that the second MI and the at least one TGT can be distinguished from any other objects present in the images:
        on a basis of said extracted information, processing any of said image representations to determine at least one of angular information of the second MI and the at least one TGT with respect to at least one axis, respectively;
        on a basis of the angle and the distance to at least one of the second MI and the at least one TGT, respectively, in relation to the first MI, and the angular information, estimating the orientation of the first MI.

2. The method according to claim 1, wherein the causing comprises causing the at least one imaging module to capture images, including alternating the activation and deactivation of the at least one first optical radiation source and of the at least one second optical radiation source.

3. The method according to claim 1, wherein
    said at least one identifying device of said TGT is a retroreflector unit, and
    said TGT is a reflective target.

4. The method according to claim 3, wherein the measuring the angle and the distance to the first MI and the at least one TGT, respectively, in relation to the second MI comprises:
    transmitting optical radiation from the at least one second optical radiation source and receiving optical radiation reflected by the retroreflector unit of the first MI and the retroreflector unit of the at least one TGT, respectively.

5. The method according to claim 4, wherein the measuring the angle and the distance to the first MI and the at least one TGT, respectively, relative to the second MI is performed by way of at least one of,
    measuring time-of-flight of optical radiation from the at least one second optical radiation source to the first MI and the at least one TGT, respectively, and
    measuring a phase difference of modulated continuous-wave optical radiation from the at least one second optical radiation source subsequent to the modulated continuous-wave optical radiation having been reflected by the retroreflector unit of the first MI and the retroreflector unit of the at least one TGT, respectively.

6. The method according to claim 1, wherein said at least one identifying device comprises at least one optical radiation source configured to continuously emit optical radiation or emit optical radiation when activated.

7. The method according to claim 1, wherein said at least one identifying device comprises at least one of a geometrical symbol and a pattern.

8. The method according to claim 1, wherein the causing of the at least one imaging module to capture images comprises:
    causing the at least one imaging module to capture at least one first image when the at least one second optical radiation source is activated and the at least one first optical radiation source is deactivated;
    causing the at least one imaging module to capture at least one second image when the at least one second optical radiation source is deactivated and the at least one first optical radiation source is activated or when the at least one second optical radiation source is activated and the at least one first optical radiation source is activated; and
    causing the at least one imaging module to capture at least one third image when the at least one second optical radiation source and the at least one first optical radiation source are deactivated.

9. The method according to claim 8, wherein the creating differential images using said image representations comprises:
    creating at least one first differential image between the at least one first and the at least one third image representation; and
    creating at least one second differential image between the at least one second and the at least one third image representation.

10. The method according to claim 9, wherein the extracting information regarding objects being present in the differential images extracts the information regarding the objects being present in the at least one first differential image and the at least one second differential image, respectively.

11. The method according to claim 1, wherein the causing of the at least one imaging module to capture images comprises:
    causing the at least one imaging module to capture at least one first image when the at least one second optical radiation source is activated and the at least one first optical radiation source is deactivated;
    causing the at least one imaging module to capture at least one second image when the at least one second optical radiation source is deactivated and the at least one first optical radiation source is activated.

12. The method according to claim 11, wherein the creating differential images using said image representations comprises:

creating at least one first differential image between the at least one first and the at least one second image representation.

13. The method according to claim 12, wherein the extracting information regarding objects being present in the differential images extracts the information regarding the objects being present in the at least one first differential image.

14. The method according to claim 1, wherein the processing of any of said image representations to determine angular information of the second MI and the at least one TGT with respect to at least one axis processes any of said image representations to estimate at least one angle between the second MI and the at least one TGT with respect to the at least one axis, wherein the angular information includes the estimated at least one angle.

15. The method according to claim 14, wherein the processing of any of said image representations to estimate at least one angle between the second MI and the at least one TGT with respect to the at least one axis comprises:
  determining at least one of a distance between the second MI and the at least one TGT, a distance between the second MI and and the at least one axis and a distance between the at least one TGT and the at least one axis.

16. The method according to claim 15, wherein said determination of the distance between the second MI and the at least one TGT, the distance between the second MI and and the at least one axis and the distance between the at least one TGT and the at least one axis, comprises:
  determining a number of pixels in any of the images between the second MI and the at least one TGT, between the second MI and the at least one axis and between the at least one TGT and the at least one axis, respectively, wherein a dimension of a pixel in the images corresponds to a distance.

17. The method according to claim 1, further comprising:
  on a basis of the measured angle and distance relative to the first MI and the at least one TGT, respectively, determining the position of the first MI and the position of the at least one TGT;
  on a basis of the position of the first MI and the position of the at least one TGT, determining the distance between the first MI and the at least one TGT;
  deriving the distance between the first MI and the at least one TGT from said extracted information;
  comparing the distance between the first MI and the at least one TGT with the distance between the first MI and the at least one TGT derived from said extracted information; and
  on a basis of the comparison, assessing an accuracy of the distinguishing of the first MI and the at least one TGT, respectively, from any other objects present in the images.

18. The method according to claim 17, further comprising:
  determining a compliance of the accuracy of said assessment relatively to an accuracy criteria.

19. A method for scanning a surface or a volume of an object to determine appearance of the object with a first measuring instrument, MI, the first MI including at least one first optical radiation source configured to emit optical radiation when activated, the method comprising:
  transmitting optical radiation from the at least one first optical radiation source to a position on the object; and
  receiving optical radiation reflected from the position on the object in order to measure an angle and a distance to the position on the object,
  wherein the direction of the transmitted optical radiation and the received optical radiation is monitored by determining a position and a orientation of the first MI by consecutively performing a method according to claim 1.

20. The method according to claim 19, further comprising:
  guiding the transmitted optical radiation at at least one position over the object.

21. A non-transitory computer readable medium comprising computer-readable instructions, which when executed by a processor, cause the process to perform the method of claim 1.

22. A system comprising;
  a first measuring instrument, MI, including a retroreflector unit;
  a second MI; and
  at least one target, TGT, said system being configured to determine a position and an orientation of the first MI, wherein
  the at least one TGT includes at least one identification device configured to enable said TGT to be identified in an image capturing said TGT;
  the second MI includes at least one second optical radiation source, configured to emit optical radiation when activated, and a position calculating circuit, the position calculating circuit including an angle measuring system and a distance measuring system configured to measure an angle and a distance to the first MI and the at least one TGT, respectively;
  the first MI further includes,
    at least one first optical radiation source configured to emit optical radiation when activated and a control module configured to selectively activate and deactivate the at least one first optical radiation source;
    a communication module configured to, on instruction from the control module, communicate control signals to the second MI for activating or deactivating the at least one second optical radiation source, the communication module being further configured to receive signals from the second MI indicating distances and angles determined by the second MI; and
    at least one imaging module configured to, on instruction from the control module, capture an image, wherein the control module is configured to cause the at least one imaging module to capture images including alternating activation and deactivation of the at least one second optical radiation source, and produce an image representation of each captured image;
  a processor configured to:
    create differential images using said image representations;
    extract information regarding objects being present in the differential images;
    distinguish the second MI and the at least one TGT, respectively, from any other objects present in the images using said extracted information;
  wherein the processing module is further configured to, on a condition that the second MI and the at least one TGT can be distinguished from any other objects present in the images:
  on a basis of said extracted information, process any of the image representations to determine at least one of angular information of the second MI and the at least one TGT with respect to at least one axis, respectively; and
  on a basis of angle and distance to at least one of the second MI and the at least one TGT, respectively, and the angular information, estimate the orientation of the first MI.

23. The system according to claim 22, wherein the control module of said first MI is configured to cause the at least one imaging module to capture images including alternating the activation and deactivation of the at least one first optical radiation source and the at least one second optical radiation source.

24. The system according to claim 22, wherein
said at least one identifying device is a retroreflector unit, and
and said TGT is a reflective target.

25. The system according to claim 24, wherein the position calculating circuit is configured to transmit optical radiation from the at least one second optical radiation source and receive reflected optical radiation and measure angle and distance to the first MI and the at least one TGT, respectively, by way of at least one of,
measuring time-of-flight of optical radiation from the at least one second optical radiation source to the first MI and the at least one TGT, respectively, and
measuring a phase difference of modulated continuous-wave optical radiation from the at least one second optical radiation source subsequent to the modulated continuous-wave optical radiation having been reflected by the retroreflector unit of the first MI and the retroreflector unit of the at least one TGT, respectively.

26. The system according to claim 22, wherein said at least one identifying device comprises at least one optical radiation source configured to continuously emit optical radiation or emit optical radiation when activated.

27. The system according to claim 22, wherein said at least one identifying device comprises at least one of a geometrical symbol and a pattern.

28. The system according to claim 22, wherein the control module is configured to cause the at least one imaging module to capture images by,
causing the at least one imaging module to capture at least one first image when the at least one second optical radiation source is activated and the at least one first optical radiation source is deactivated,
causing the at least one imaging module to capture at least one second image when the at least one second optical radiation source is deactivated and the at least one first optical radiation source is activated, or cause the at least one imaging module to capture at least one second image when the at least one second optical radiation source is activated and the at least one first optical radiation source is activated, and
causing the at least one imaging module to capture at least one third image when the at least one second optical radiation source and the at least one first optical radiation source are deactivated.

29. The system according to claim 28, wherein the processor is configured to create differential images using said image representations by:
creating at least one first differential image between the at least one first and the at least one third image representation; and
creating at least one second differential image between the at least one second and the at least one third image representation.

30. The system according to claim 29, wherein the processor is configured to extract information regarding objects being present in the differential images by extracting information regarding objects being present in the at least one first differential image and the at least one second differential image, respectively.

31. The system according to claim 22, wherein the control module is configured to cause the at least one imaging module to capture images by causing the at least one imaging module to capture at least one first image when the at least one second optical radiation source is activated and the at least one first optical radiation source is deactivated, and
causing the at least one imaging module to capture at least one second image when the at least one second optical radiation source is deactivated and the at least one first optical radiation source is activated.

32. The system according to claim 31, wherein the processor is configured to create differential images using said image representations by creating at least one first differential image between the at least one first and the at least one second image representation.

33. The system according to claim 32, wherein the processor is adapted to extract information regarding objects being present in the differential images by extracting information regarding the objects being present in the at least one first differential image.

34. The system according to claim 22, wherein the processor is further configured to process any of said image representations to determine angular information of the second MI and the at least one TGT with respect to at least one axis by estimating at least one angle between the second MI and the at least one TGT with respect to the at least one axis, wherein the angular information includes the estimated at least one angle.

35. The system according to claim 34, wherein the processor is further configured to estimate the at least one angle by determining a distance between the second MI and the at least one target, a distance between the second MI and and the at least one axis and a distance between the at least one target and the at least one axis.

36. The system according to claim 35, wherein the processor is further configured to determine the distance between the second MI and the at least one target, the distance between the second MI and and the at least one axis and the distance between the at least one target and the at least one axis by determining a number of pixels in any of the images between the second MI and the at least one target, between the second MI and the at least one axis and between the at least one target and the at least one axis, respectively, wherein a dimension of a pixel in the images corresponds to a distance.

37. The system according to claim 22, wherein the processor is further configured to:
on a basis of the measured angle and distance relative to the first MI and the at least one TGT, respectively, determine the position of the first MI and the position of the at least one TGT;
on a basis of the position of the first MI and the position of the at least one TGT, determine distance between the first MI and the at least one TGT;
derive the distance between the first MI and the at least one TGT from said extracted information;
compare the distance between the first MI and the at least one TGT with distance between the first MI and the at least one TGT derived from said extracted information; and
on a basis of the comparison, assess an accuracy of the distinguishing of the first MI and the at least one TGT, respectively, from any other objects present in the images.

38. The system according to claim 22, wherein the second MI further comprises a tracker and a servo system configured to,
monitor the position of the first MI, and the control module is configured to consecutively capture sets of images including alternating activation and deactivation of the at least one first optical radiation source and the at least one second optical radiation source, and estimate orientation of the first MI on basis of each of the captured sets of images.

39. The system according to claim 38, wherein the communication module is further configured to, on instruction from the control module, communicate control signals to the second MI configured to temporally synchronize the monitoring of the position of the first MI and the estimation of orientation of the first MI.

40. The system according to claim 22, wherein the first MI comprises a portable scanner configured to, enable hand-held operation by a user, and determine an appearance of an object.

41. The system according to claim 22, wherein the second MI comprises a surveying instrument such as a total station or theodolite.

42. A first measuring instrument configured to enable operation thereof in a system according to claim 22.

43. A measuring instrument, MI, for scanning a surface or a volume of an object to determine an appearance of the object, the MI being included in a system according to claim 22, wherein the first MI is configured to transmit optical radiation from the at least one first optical radiation source to a position on the object and receive optical radiation reflected from the position on the object in order to measure the angle and the distance to the position on the object, wherein the direction of the transmitted optical radiation and the received optical radiation is monitored by consecutively determining the position and the orientation of the first MI.

44. The first MI according to claim 43, further comprising;

a scanning device configured to guide the transmitted optical radiation at at least one position over the object.

* * * * *